(12) United States Patent
Fischer et al.

(10) Patent No.: US 8,521,571 B1
(45) Date of Patent: Aug. 27, 2013

(54) SYSTEM, METHOD AND COMPUTER PROGRAM PRODUCT FOR MANAGING BUSINESS HOURS IN AN ON-DEMAND SERVICE

(75) Inventors: Mark A. Fischer, Ashland, OR (US); Marco Salvatore Casalaina, San Francisco, CA (US); Benjamin Tsai, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 586 days.

(21) Appl. No.: 12/437,461

(22) Filed: May 7, 2009

Related U.S. Application Data

(60) Provisional application No. 61/051,166, filed on May 7, 2008.

(51) Int. Cl.
*G06Q 40/00* (2012.01)

(52) U.S. Cl.
USPC ........................................ 705/7.11; 705/7.42

(58) Field of Classification Search
USPC ....................................................... 705/7.42
See application file for complete search history.

(56) References Cited

U.S. PATENT DOCUMENTS

| | | | | |
|---|---|---|---|---|
| 5,111,391 | A * | 5/1992 | Fields et al. | 705/7.14 |
| 6,049,776 | A * | 4/2000 | Donnelly et al. | 705/7.14 |
| 6,970,829 | B1 * | 11/2005 | Leamon | 705/7.14 |
| 7,155,399 | B2 * | 12/2006 | Andre et al. | 705/7.14 |
| 7,209,929 | B2 | 4/2007 | Dominguez, Jr. et al. | 707/103 |
| 7,672,746 | B1 * | 3/2010 | Hamilton et al. | 700/100 |
| 7,698,160 | B2 | 4/2010 | Beaven et al. | |
| 8,082,301 | B2 | 12/2011 | Ahlgren et al. | |
| 8,095,413 | B1 | 1/2012 | Beaven | |
| 8,095,594 | B2 | 1/2012 | Beaven et al. | |
| 8,275,836 | B2 | 9/2012 | Beaven et al. | |
| 2002/0040313 | A1 * | 4/2002 | Hunter et al. | 705/9 |
| 2003/0233404 | A1 | 12/2003 | Hopkins | 709/203 |
| 2004/0267591 | A1 * | 12/2004 | Hedlund et al. | 705/9 |
| 2005/0065925 | A1 | 3/2005 | Weissman et al. | 707/4 |
| 2005/0223022 | A1 | 10/2005 | Weissman et al. | 707/102 |
| 2005/0283478 | A1 | 12/2005 | Choi et al. | 707/9 |
| 2006/0206834 | A1 | 9/2006 | Fisher et al. | 715/777 |

OTHER PUBLICATIONS

U.S. Appl. No. 60/828,192, filed Oct. 4, 2006.

* cited by examiner

*Primary Examiner* — Thomas Dixon
*Assistant Examiner* — Benjamin S Fields
(74) *Attorney, Agent, or Firm* — Zilka-Kotab, PC

(57) ABSTRACT

In accordance with embodiments, there are provided mechanisms and methods for managing multiple business hours in an on-demand service. These mechanisms and methods for managing multiple business hours in an on-demand service can enable embodiments to provide access to a stored set of business hours for a user to track, at a user level. The ability of embodiments to provide this access may allow users of such on-demand services better insight as to how much time their agents are spending on cases.

17 Claims, 7 Drawing Sheets

FIGURE 2A

Business Hours Detail

Business Hours Name: Uruguay
Time Zone: (GMT-03:00) Brasilia Time (America/Sao_Paulo)

Business Hours: 
Sunday       No Hours
Monday       8:00 AM to 8:00 PM
Tuesday      8:00 AM to 8:00 PM
Wednesday    8:00 AM to 8:00 PM
Thursday     8:00 AM to 8:00 PM
Friday       24 Hours
Saturday     No Hours Default Business Hours Active
Created By: Marco Casalaina 7/2/2009 11:44 AM
Last Modified By: Marco Casalaina 4/14/2009 11:07 AM

Holidays

Holiday Name    Description    Date and Time
Christmas                      12/25/2009 All Day ☐

SYSTEM, METHOD AND COMPUTER PROGRAM PRODUCT FOR MANAGING BUSINESS HOURS IN AN ON-DEMAND SERVICE

CLAIM OF PRIORITY

This application claims priority to U.S. Provisional Patent Application 61/051,166 entitled "Method And System For Managing Multiple Business Hours In An On-Demand Service," by Mark A. Fischer et al., filed May 7, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to managing business hours for users of such database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Often, users of such database systems are large enterprises with sizeable agent pools and offices in many different locations. There is often a desire to be able to report on and track cases associated with the users in terms of the business hours of those specific offices, rather than in calendar time. To date, however, the users have been unable to report on and track the cases in terms of the business hours for the specific offices.

BRIEF SUMMARY

In accordance with embodiments, there are provided mechanisms and methods for managing multiple business hours in an on-demand service. These mechanisms and methods for managing multiple business hours in an on-demand service can enable embodiments to provide access to a stored set of business hours for a user to track, at a user level. The ability of embodiments to provide this access may allow users of such on-demand services better insight as to how much time their agents are spending on cases.

In an embodiment and by way of example, a method is provided for managing multiple business hours in an on-demand service. In use, a set of business hours corresponding to a plurality of offices in different locations is received from a user of an on-demand service. Furthermore, the set of business hours is stored in a shared database associated with the user. Additionally, access is provided to the stored set of business hours for the user to track, at a user level.

While the present invention is described with reference to an embodiment in which techniques for managing multiple business hours in an on-demand service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 2A shows an interface for managing multiple business hours in an on-demand service, in accordance with one embodiment.

FIG. 2B shows an interface for managing multiple business hours, including holiday exceptions, in an on-demand service, in accordance with one embodiment.

FIG. 2C shows an interface for generating holiday hours to be integrated into the set of business hours, in accordance with one embodiment.

DETAILED DESCRIPTION

General Overview

Systems and methods are provided for managing multiple business hours in an on-demand service.

Often, users of database systems are large enterprises with sizeable agent pools and offices in many different locations.

There is often a desire to be able to report on and track cases associated with the users in terms of the business hours of those specific offices, rather than in calendar time. Currently, however, the users are unable to report on and track the cases in terms of the business hours of the specific offices.

Thus, mechanisms and methods are provided herein for managing multiple business hours in an on-demand service. These mechanisms and methods for managing multiple business hours in an on-demand service can enable embodiments to provide access to a stored set of business hours for a user to track, at a user level. The ability of embodiments to provide this access may allow users of such on-demand services better insight as to how much time their agents are actually spending on cases.

Next, mechanisms and methods for managing multiple business hours in an on-demand service will be described with reference to exemplary embodiments.

Figure 1:
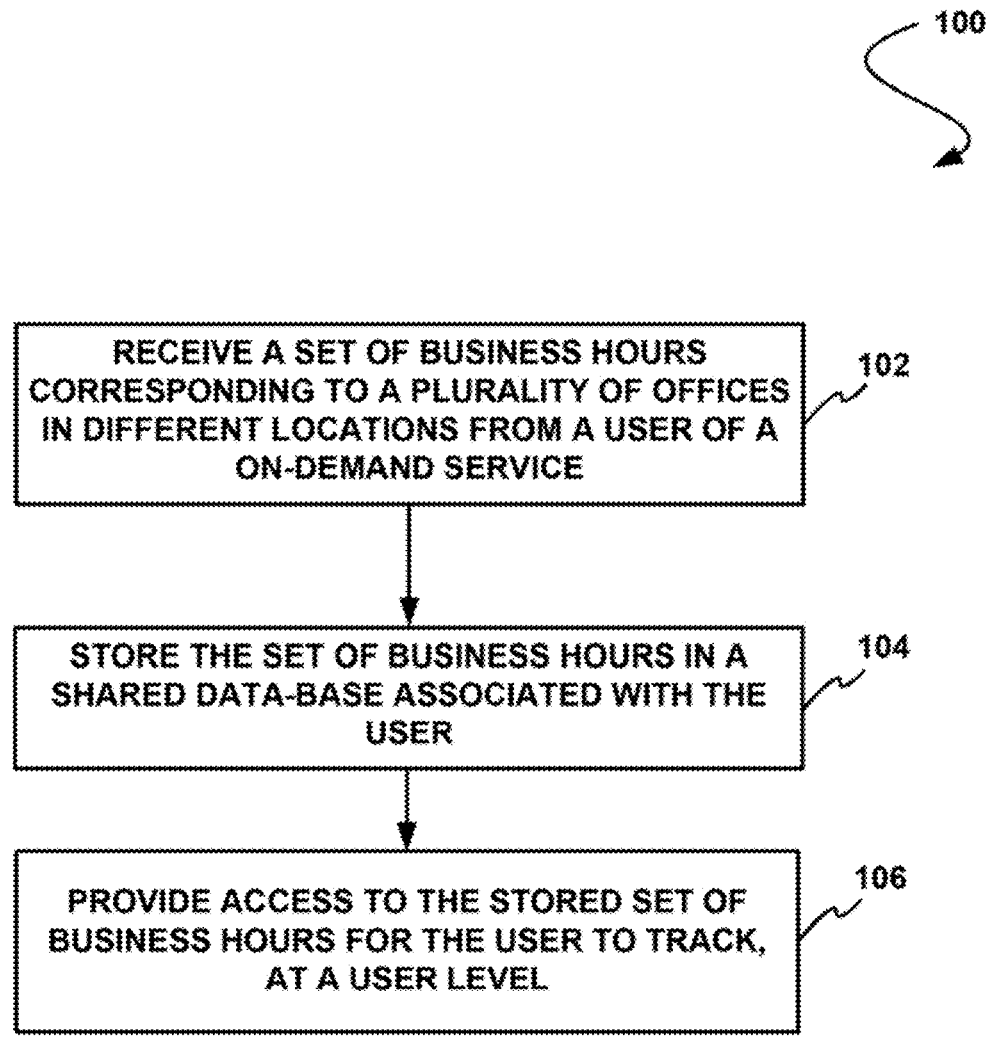
FIG. 1 shows a method for managing multiple business hours in an on-demand service, in accordance with one embodiment.

FIG. 1 shows a method 100 for managing multiple business hours in an on-demand service, in accordance with one embodiment. As shown, a set of business hours corresponding to a plurality of offices in different locations is received from a user of an on-demand service. See operation 102.

In the context of the present description, an on-demand service refers to any service that relies on a system that is accessible over a network. For example, in one embodiment, the on-demand service may include an on-demand database service. An on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Furthermore, in the context of the present description, a set of business hours refers to one or more hours in a time zone that may define the hours during which a particular office is active, or that may define the hours during which certain customers are entitled to support. In various embodiments, the business hours may include working hours, holiday hours, vacation hours, paid time off (PTO) hours, and/or various other hours.

Additionally, in the context of the present description, the offices may include any entity with business hours capable of being tracked. For example, in various embodiments, the offices may include a building, a company, an employer, and/or various other entities.

Once the set of business hours are received, the set of business hours are stored in a shared database associated with the user. See operation 104. As an option, the shared database may include one or more databases associated with the on-demand service.

Furthermore, access is provided to the stored set of business hours for the user to track, at a user level. See operation 106. In one embodiment, the set of business hours may be in terms of business hours of tenant offices specified in a business hours object. In this case, the set of business hours in terms of the business hours of the tenant offices may be different than a calendar time associated with the on-demand service. It should be noted that the object may include any table, portion of a table, or other data structure.

In addition to allowing access to the stored set of business hours, as an option, mathematical calculations may be performed, based on the stored set of business hours. In this case, the mathematical calculations may be capable of being performed at the user level. The user level may refer to any level to which the user has the ability to access. For example, the user level may include a level of a tenant of the on-demand service.

It should be noted that, in one embodiment, the set of business hours may include one or more exceptions. The exceptions may include any exception or deviation from a standard set of business hours associated with an office. Additionally, the exceptions may include user defined exceptions and/or automatically defined exceptions.

In one embodiment, the exceptions may include one or more holiday exceptions. In this case, the holiday exceptions may be automatically and transparently integrated into the set of business hours. Additionally, the integration may be transparent to a user of the on-demand service (e.g. a user tenant, a user organization, etc.). As an option, the one or more holiday exceptions may be automatically integrated into the set of business hours based on a geographical location of the plurality of offices. Additionally, the one or more holiday exceptions may be configured to reoccur automatically.

Still yet, in one embodiment, a workflow may be generated based, at least in part, on the set of business hours. Further, alerts may be generated utilizing the workflow and the set of business hours. As an option, the workflow may further be generated based on holiday hours included in the set of business hours.

Figure 2A:
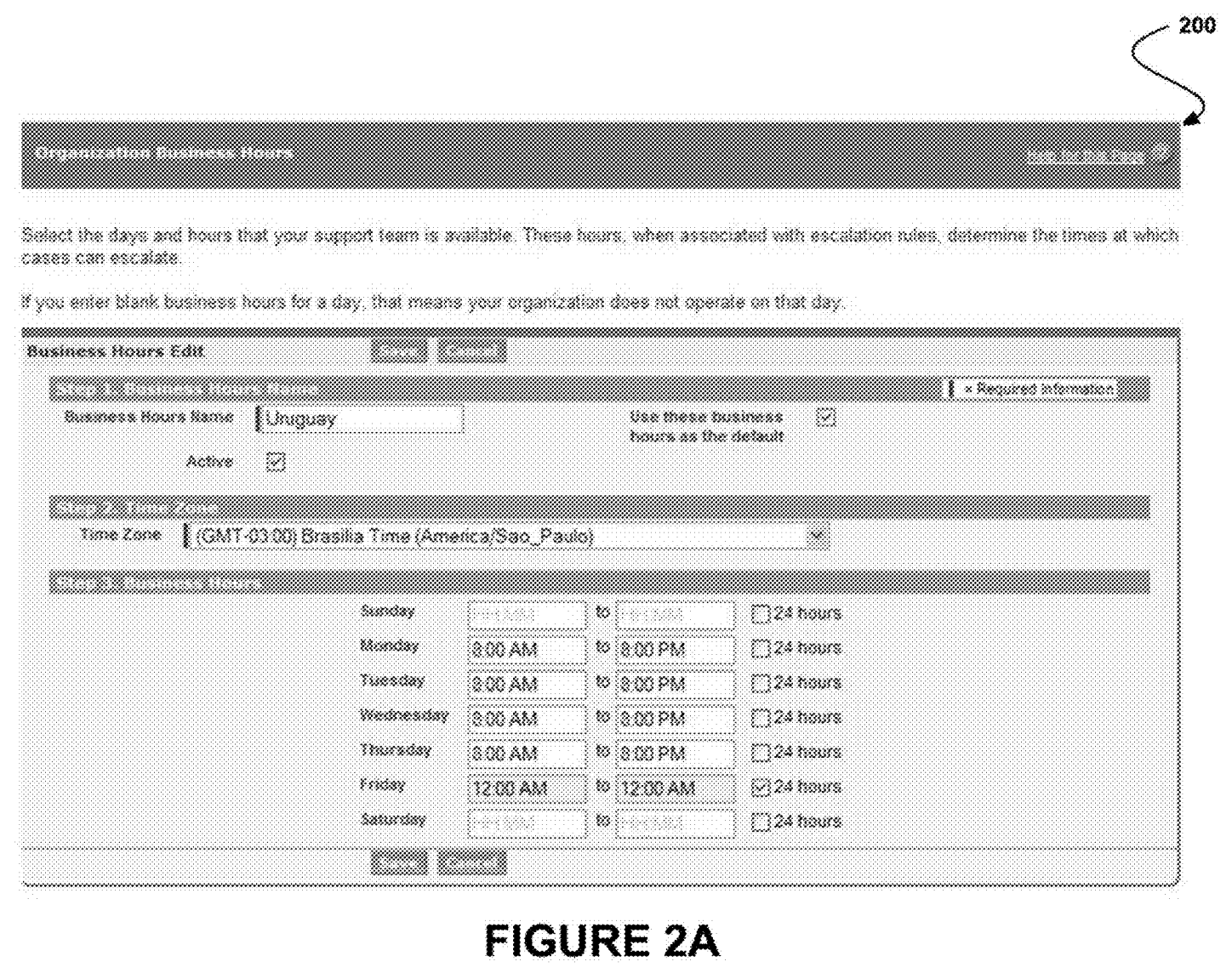

FIG. 2A shows an interface 200 for managing multiple business hours in an on-demand service, in accordance with one embodiment. As an option, the present interface 200 may be utilized in the context of the functionality of FIG. 1. Of course, however, the interface 200 may be implemented in any desired environment. The aforementioned definitions may apply during the present description.

In operation, the interface 200 may be utilized to set and/or edit business hours for an office (e.g. an organization, etc.). The interface 200 may be accessible by a user (e.g. a tenant, an organization, etc.) of on on-demand service. Using the interface 200, a user of the on-demand database service may configure or generate a set of business hours corresponding to a plurality of offices in different locations from a user of an on-demand service. Furthermore, the business hours may be stored in a shared database such that the user may access to the stored business hours for the user to track.

In this way, for large enterprises with offices in many different geographical locations, users may be able to report on and track their cases in terms of the business hours of those specific offices, rather than in calendar time. This may give them a better idea of how much time their agents (e.g. employees, etc.) are actually spending on cases.

Furthermore, multiple sets of business hours may be specified and assigned to different pieces of data, holidays may be specified, and business hours handling techniques may be implemented (e.g. using the Apex computer programming language, or any other computer programming language, etc.).

In one embodiment, business hours and their attendant time zones may be specified utilizing the interface 200, or a separate interface. The granularity of the start and end times of the business hours may be different in various embodiments. For example, in one embodiment, the granularity of the start and end times may be at least 15 minutes, and may optionally be set to the individual minute level.

Furthermore, in one embodiment, the business hours may be defined by a business hours object that is a top-level object in an application programming interface (API). In this case, any object may be capable of having a custom lookup field. Additionally, standard lookups to the business hours object may be implemented from a case associated with a tenant of the on-demand service and/or from a service level agreement (SLA) process. In this case, an SLA may define the specific durations in which companies are contractually obligated to respond and resolve support cases that are logged with them. An SLA process refers to any process associated defining an SLA.

In one embodiment, the business hours object may have a Boolean flag called "Active." In this case, inactive business hours may not show up in the list of available business hours in lookups from cases or SLA processes. As an option, if a user attempts to inactivate a business hours object that is being utilized in the context of one or more business hours, the action may be prevented and a list of the SLA processes that are blocking the action may be presented to the user. Further, cases that are using inactive business hours may continue to calculate using those business hours until their business hours are explicitly reset.

In one embodiment, business hours may be configured such that only a default system administrator profile has full create, read, update, and delete (CRUD) access for business hours. In another embodiment, other profiles (e.g. including custom profiles, etc.) may have only read access by default. Furthermore, as an option, portal profiles may not have CRUD access for business hours by default.

In some cases, deletion may not be permitted for business hours. In these cases, no profiles may be able to turn on the delete permission.

It should be noted that various permissions may be set as a default, in various embodiments. Additionally, a particular set of business hours may optionally be set as a default. As an option, a Boolean field may be defined for a set of business hours that determines whether a given set of business hours is the default.

Using the interface 200, a user may update a set of business hours. In one embodiment, if a set of business hours that is used in cases or SLA processes is updated, no recalculation may occur. In this case, all time-based triggers and case history rows may remain intact. Furthermore, only future calculations may take into account the updated business hours.

Various calculations may be performed in the context of business hours. In one embodiment, specific functions may be utilized for performing such calculations. These functions may be implemented utilizing any suitable computer programming language (e.g. Apex, etc.).

In one embodiment, a function may be implemented that returns a datetime that represents a specified datetime plus the specified number of hours in the given set of business hours. Additionally, a function may be implemented that returns a datetime that represents the specified datetime minus the specified number of hours in the given set of business hours.

Further, a function may be implemented that returns a floating point number that represents the number of business hours between the second and first datetimes. This number may be negative if the first datetime is later than the second. As another option, a function may be implemented that returns the number of working days between a first time and a second time in terms of the given business hours. A working day is defined as a calendar day during which there are any business hours.

In one embodiment, business hours objects may be available in pointwise formulas that calculate times using the business hours. In this case, pointwise formulas may be the type of formulas that are used in workflow rules and summary fields. In one embodiment, the pointwise formulas may be configured to be different than bulk formulas, which may be used in formula fields. For example, the pointwise formulas may be configured to be calculated in Java, where bulk formulas may be calculated in SQL.

In another embodiment, functions that allow arbitrary calculations using business hours may be added to the formula language. For example, a function may be implemented that returns a datetime that represents the specified datetime plus the specified number of hours in the given set of business hours. Additionally, a function may be implemented that returns a datetime that represents the specified datetime minus the specified number of hours in the given set of business hours.

Furthermore, a function may be implemented that returns a floating point number that represents the number of business hours between the second and first datetimes. This number may be negative if the first datetime is later than the second. Still yet, a function may be implemented that returns the number of working days between a first time and a second time in terms of the given set of business hours. As an option, a working day may be defined as a calendar day during which there are any business hours.

As an option, the business hours object may be implemented as a deletable singleton or an undeletable, multi-row entity. Furthermore, in one embodiment, a "time only" column type may be implemented in the business hours object, such that the start/end time fields may be changed from static enumerators to more granular time values with millisecond-level precision in the persistence layer and minute-level precision at a user interface level. Additionally, API access may be able to access millisecond-level precision.

In addition to a business hours object, in one embodiment, an object associated with holidays may be utilized. As an option, holidays may be shared across sets of business hours. In this case, the holidays object may be linked to a set of business hours (or an associated object) via a transparent many-to-many related list. In this way, there may be a pool of holidays from which users (e.g. administrator tenants, etc.) may choose holidays when setting up a new set of business hours.

In one embodiment, the holidays object may be configured such that holidays may be set up generically. As an option, a button may exist on the interface for editing business hours to add a new holiday on the fly.

FIG. 2B shows an interface 220 for managing multiple business hours, including holiday exceptions, in an on-demand service, in accordance with one embodiment. As an option, the present interface 220 may be utilized in the context of the functionality of FIGS. 1-2A. Of course, however, the interface 220 may be implemented in any desired environment. Again, the aforementioned definitions may apply during the present description.

Using the interface 220, holiday hours may be added to a set of business hours. In one embodiment, the holiday hours may be pre-configured or pre-existing holiday hours. In this case, a user may add holiday hours by selecting the holiday hours to add and clicking an "Add" button. Similarly, holiday hours may be removed from a set of business hours by clicking a "Remove" button.

Figure 2C:
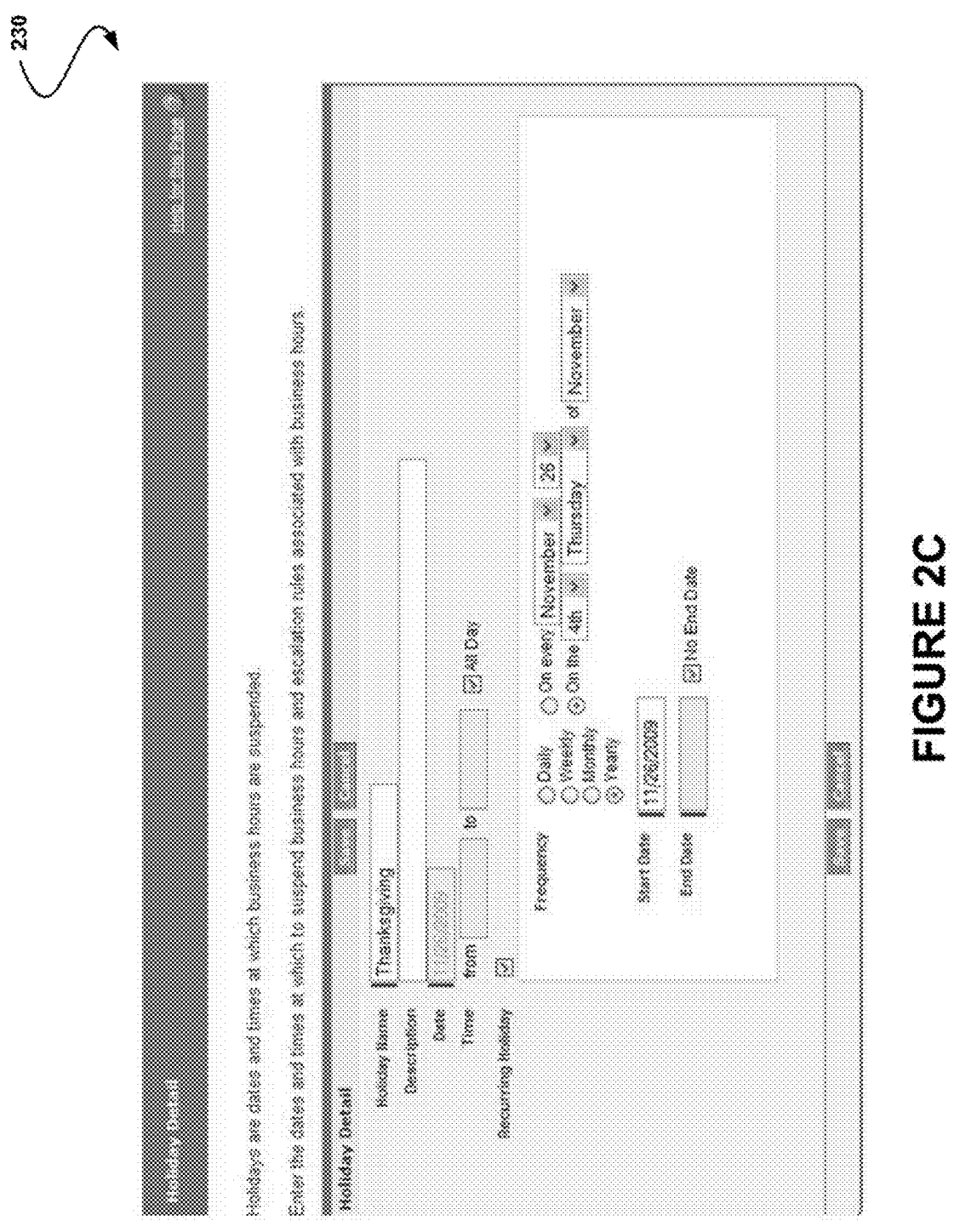

In one embodiment, a user may configure and/or generate holiday hours that may be integrated into the set of business hours. FIG. 2C shows an interface 230 for generating holiday hours to be integrated into the set of business hours, in accordance with one embodiment. As an option, the present interface 230 may be utilized in the context of the functionality of FIGS. 1-2B. Of course, however, the interface 230 may be implemented in any desired environment. Further, the aforementioned definitions may apply during the present description.

Utilizing the interface 230, a user may generate and/or configure holiday hours. Holidays may be definable on an individual day or repeatable basis. For example, an administrator may create a holiday that is Dec. 25, 2020, or he could create a holiday that is every December 25. Any level of granularity for this repeatability may be allowed. Furthermore, holidays may be definable using a "from" datetime and a "to" datetime, thereby giving user the capability to define partial-day holidays. In one embodiment, holidays may reuse the recurrence metaphor from a calendar, giving administrators maximum flexibility to create and maintain recurring holidays.

In use, business hours objects may be associated with 0:N holidays, where N is and integer, during which the elapsed time clock in terms of business hours may be suspended. In various embodiments, holidays may be recurring, all day, or partial-day holidays. The holiday may also have a many-to-many relationship to business hours. For example, a single instance of the Christmas holiday may be shared across many different business hours objects.

In one embodiment, holidays (e.g. one-time holidays, recurring holidays, all day holidays, or partial day holidays, etc.) may be stored as a new type of activity to such that a recurrence feature may be utilized. Further, in one embodiment, the holiday object may have its own object entity/key prefix, different from an event, to minimize mutual dependencies.

As noted above, holidays may be infinitely reoccurring or seemingly infinitely reoccurring holidays. This may be accomplished in various ways. For example, in one embodiment, a limit for a number of holidays may be relaxed to a larger number (e.g. from 1 to 100, etc.). Additionally, instead of creating a fixed number of occurrences, enough occurrences may be created such that the last occurrence takes place far in the future from a present date (e.g. 100 years from a date, etc.). As another option, the holidays may be configured such that any blowing out of the reoccurrences for holidays is avoided. In this case, occurrences may be calculated dynamically in a middle tier when needed.

In embodiments where business hour math is supported, such as for adding a given number of business hours excluding holidays to a date that may be arbitrary, a non-blown-out approach may be utilized. Furthermore, there may be dozens of holidays shared within an organization. In these cases, recurring holidays and their occurrences may be calculated and cached.

In various embodiments, holidays and other exceptions may be configured to occur at different intervals. For example, in one embodiment, holidays may be configured to occur at a yearly interval. In this case, two types of reoccurrences may be implemented, a fixed date (e.g. January 1, etc.) or a fixed day in week (e.g. the first Monday of September, etc.) every year. In these cases, any necessary Java Calendar fields may be set to match the pattern and it may be compared to the target. If it is earlier than the target, a year may be added.

In another embodiment, holidays may be configured to occur at a yearly interval. In this case, two types of reoccurrences may be implemented, a fixed day (e.g. day 10, etc.) or fixed day in the week (e.g. the second Monday, etc.) every N months. In these cases, to calculate the next occurrence, the month of the first occurrence may be determined because not every month may be valid. The first occurrence may be calculated and stored in a specific field when saved (e.g. a "RecurrenceStartdateTime" field, etc.). The difference in the month between the target date and the first occurrence may then be computed. In this way, there is no need to calculate all occurrences in between because of the fixed interval.

In another embodiment, holidays may be configured to occur at a weekly interval. An example of this pattern is every Monday or Friday every N weeks. In this case, the calculation may be implemented similarly to the monthly pattern. The number of weeks between the target date the first occurrence may be calculated.

In another embodiment, holidays may be configured to occur at a daily interval. This calculation may occur in a similar manner to the weekly calculation.

With respect to partial day holidays, as an option, the partial day holidays may be time zone agnostic. For example, a first user in GMT-8 may create a holiday for September 1, 8 am-12 pm, and a second user in time zone GMT+8 may see the same holiday also at September 1, 8 am-12 pm. This may also be implemented for business hours calculations.

Further, in one embodiment, restrictions may be placed on holidays. For example, a user may be prohibited from defining holidays across a day boundary (e.g. September 1, 11 pm to September 2, 3 am, etc.).

In various embodiments, calendars and events may be used to support holiday functionality in different ways. For example, in one embodiment, a special, hidden calendar may be created as a container for business hours object related holidays. As an option, this calendar may be a singleton per organization, containing all holidays that have been defined and associated with one or more business hours objects.

As another option, an association table may be maintained to map events on the holiday calendar to business hours objects. Additionally, any API delete of events on the business hours holiday calendar may be blocked if there are associations to any business hours objects. In one embodiment, events may be automatically deleted from the calendar when the last association is removed. In this way, the association table may not need to be checked during an event delete.

It should be noted that the implementation of business hours and associated objects, and holiday hours may facilitated in a variety of ways. Table 1 shows a data model for integrating holidays into business hours, in accordance with one embodiment.

TABLE 1

```
ALTER TABLE support.business_hours ADD
  name VARCHAR2(240 BYTE),
  is_default CHAR(1 BYTE) NOT NULL DEFAULT '0',
  active CHAR(1 BYTE) NOT NULL DEFAULT '0',
  time_zone_sid_key NUMBER
  );
-- redo AK index to include name
  DROP INDEX support.akbusiness_hours;
EXEC
upgdata.uUpgradeUtils.create_partitioned_index('akbusiness_hours',
'support', 'business_hours', 'organization_id, name', 1);
-- escalation rule entry has optional FK to BusinessHours
ALTER TABLE core.rule_filter ADD   (
  business_hours_id CHAR(15 BYTE)
  );
ALTER TABLE support.cases ADD   (
  business_hours_id CHAR(15 BYTE)
  );
```

TABLE 1-continued

```
CREATE TABLE support.business_hours_holiday (
  organization_id CHAR(15 BYTE) NOT NULL,
  business_hours_id CHAR(15 BYTE) NOT NULL,
  holiday_id CHAR(15 BYTE) NOT NULL,
  system_modstamp date DEFAULT SYSDATE NOT NULL
);
CREATE INDEX support.pkbusiness_hours_holiday ON
support.business_hours_holiday (organization_id, business_hours_id,
holiday_id);
CREATE INDEX support.iebusiness_hours_holiday_h ON
support.business_hours_holiday (organization_id, holiday_id);
CREATE INDEX support.iebusiness_hours_hol_modstamp ON
support.business_hours_holiday (organization_id, system_modstamp);
```

Furthermore, in various embodiments, the aforementioned functionality may be implemented by a user of an on-demand database service using a single user interface or multiple user interfaces.

Figure 2D:
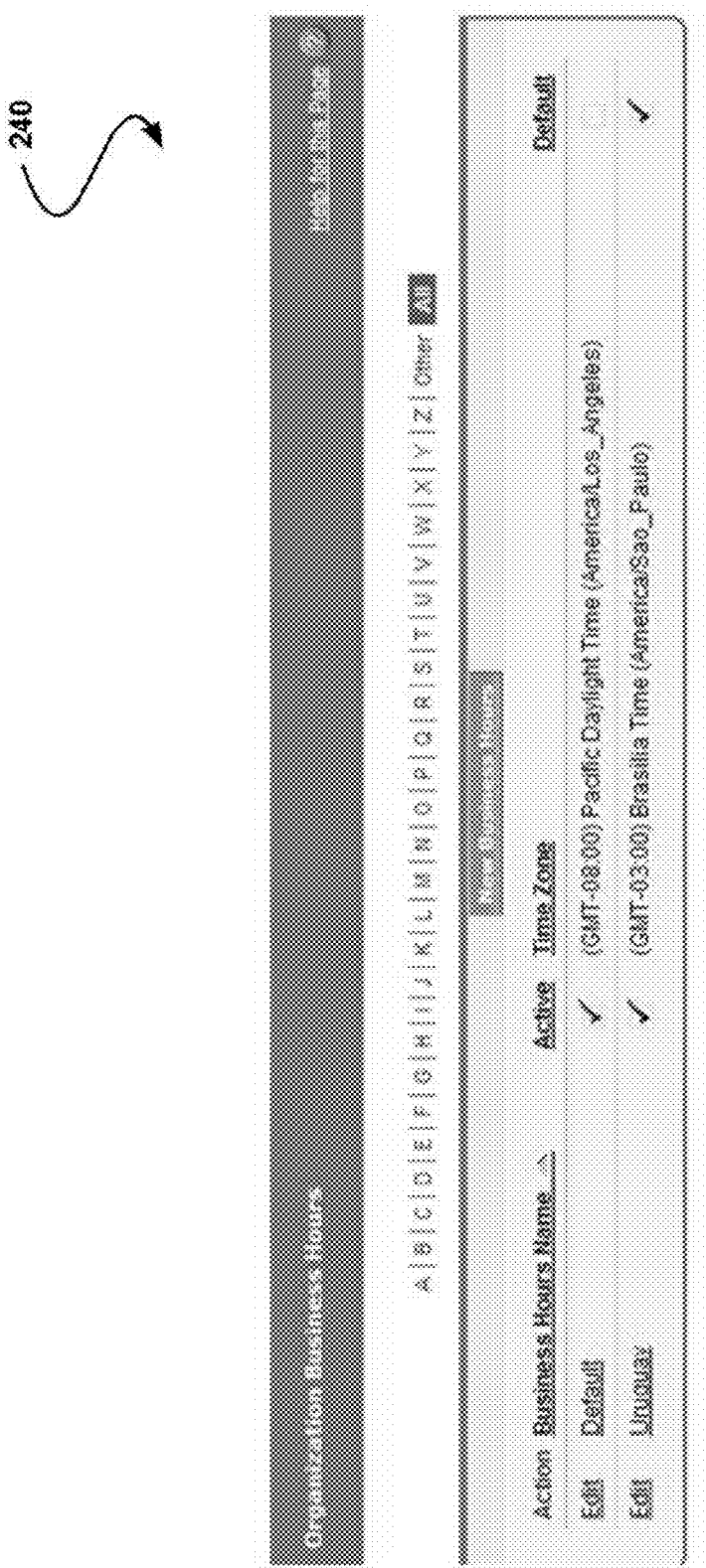
FIG. 2D shows an interface for managing multiple business hours in an on-demand service, in accordance with another embodiment.

FIG. 2D shows an interface 240 for managing multiple business hours in an on-demand service, in accordance with another embodiment. As an option, the present interface 240 may be utilized in the context of the functionality of FIGS. 1-2C. Of course, however, the interface 240 may be implemented in any desired environment. Further, the aforementioned definitions may apply during the present description.

In operation, the interface 240 may be utilized to add new business hours and/or set default business hours. The interface 240 may be utilized by an organization that is associated with one or more offices in a variety of geographical locations.

System Overview

Figure 3:
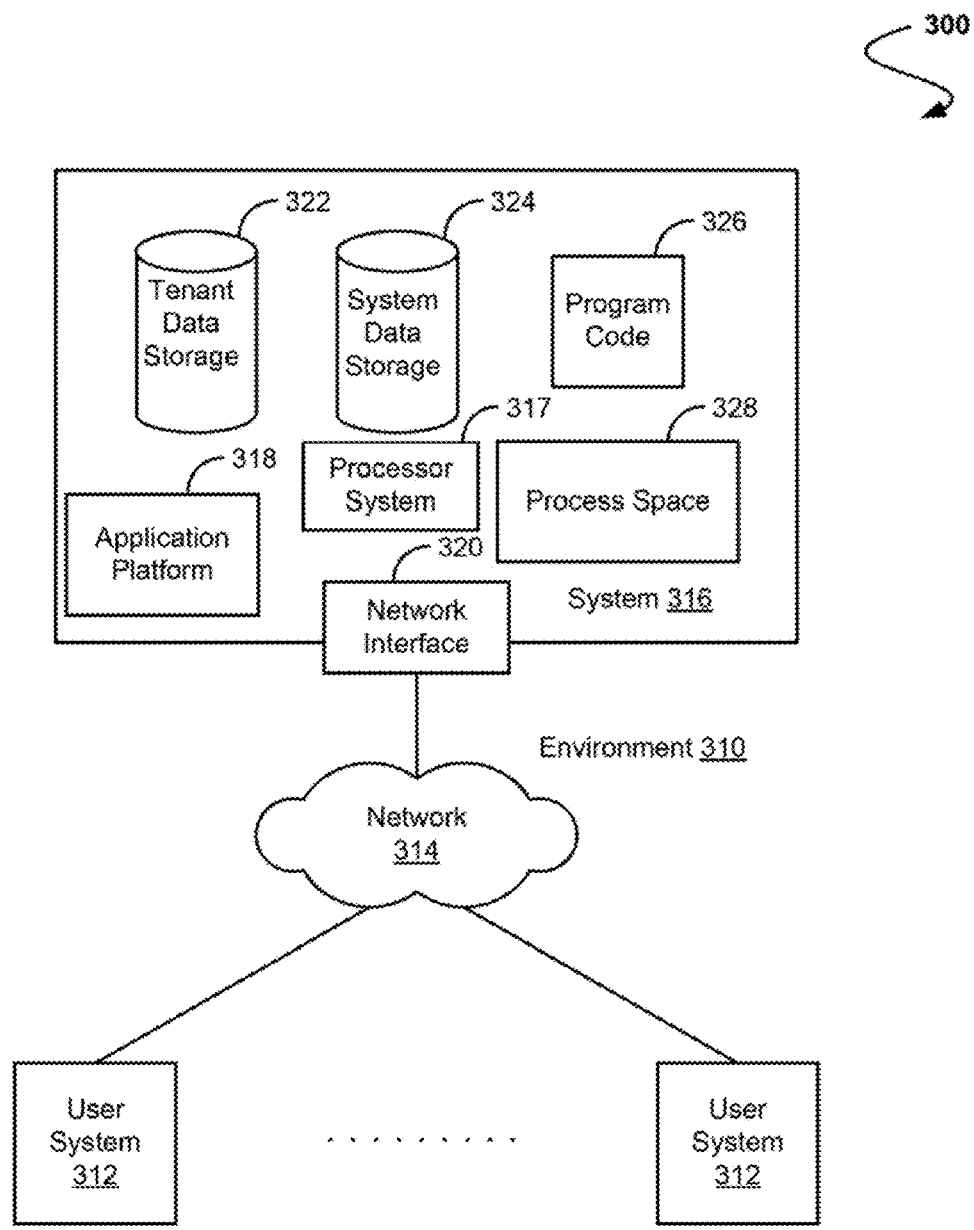
FIG. 3 illustrates a block diagram of an example of an environment wherein an on-demand database service might be used.

FIG. 3 illustrates a block diagram of an environment 310 wherein an on-demand database service might be used. As an option, any of the previously described embodiments of the foregoing figures may or may not be implemented in the context of the environment 310. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

Figure 4:
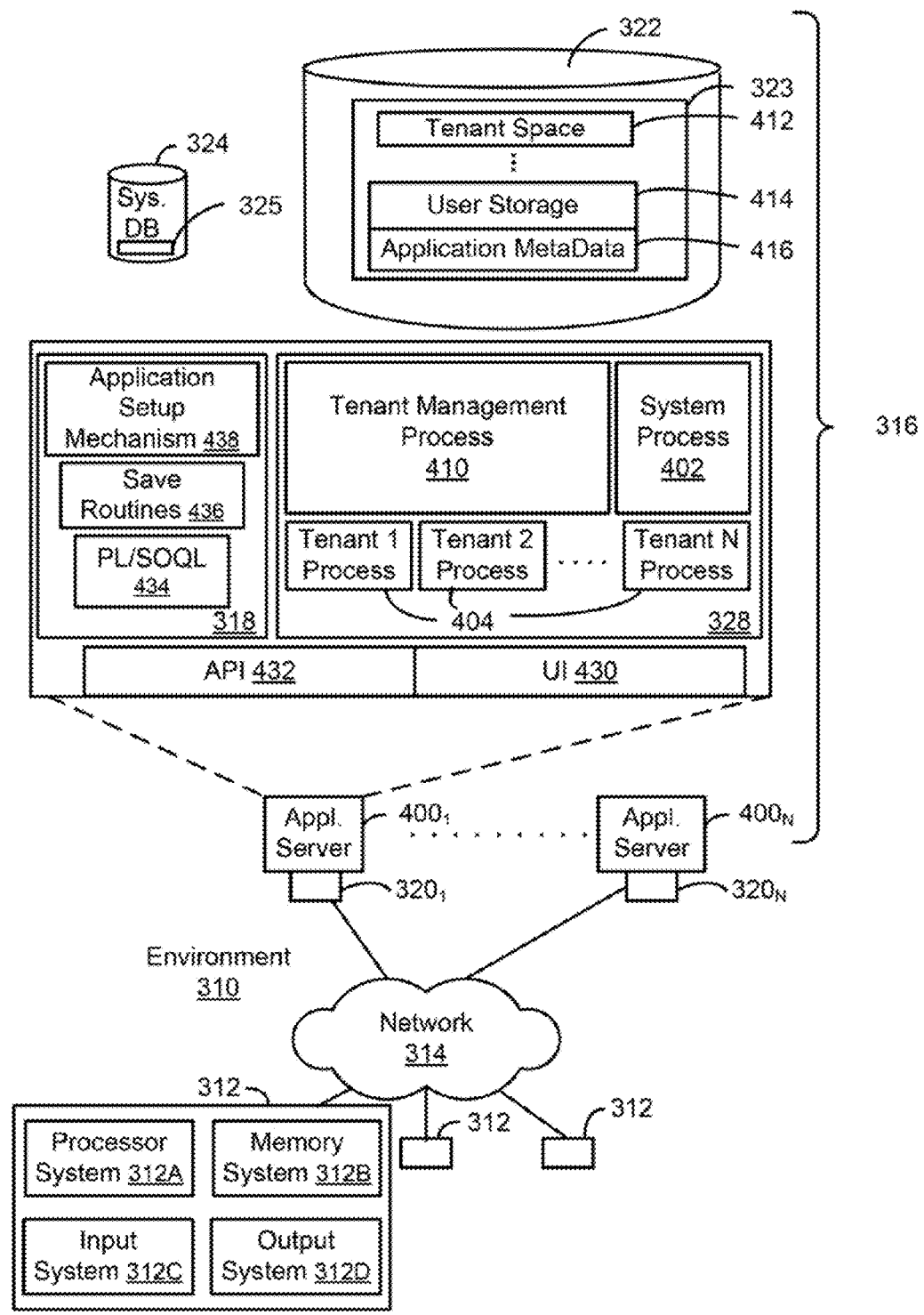
FIG. 4 illustrates a block diagram of an embodiment of elements of FIG. 3 and various possible interconnections between these elements.

One arrangement for elements of system 316 is shown in FIG. 4, including a network interface 320, application platform 318, tenant data storage 322 for tenant data 323, system data storage 324 for system data accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317 of FIG. 3, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 400$_1$-400$_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 416 for the subscriber making the invocation and executing the metadata as an application in a virtual machine. It should be noted that any reference to the PL/SOQL programming language may be discussed equally in the context of the Apex programming language.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving a set of business hours corresponding to a plurality of offices in different locations from a user of an on-demand service, wherein the set of business hours include one or more exceptions to standard business hours associated with the plurality of offices;
receiving a set of holiday hours corresponding to each of the offices in the different locations from the user of the on-demand service;
automatically integrating the set of holiday hours into the set of business hours based on a geographical location of the plurality of offices;
storing the set of business hours and the set of holiday hours in a shared database associated with the user, utilizing a processing machine;
providing access to the stored set of business hours and the set of holiday hours for the user to track, at a user level; and
generating a workflow for one of the offices based on the corresponding set of holiday hours and the corresponding set of business hours;
wherein the set of business hours are stored in a business hours object and the set of holiday hours are stored in a holiday hours object, and further the set of holiday hours correspond to the set of business hours by linking the holiday hours object with the business hours object;
wherein the set of holiday hours are utilized to suspend the set of business hours and rules associated with the set of business hours;
wherein the business hours object is included in a formula that calculates times using the set of business hours that are stored in a business hours object, and the formula is used in a workflow rule.

2. The method of claim 1, wherein the set of business hours are in terms of business hours of tenant offices specified in a business hours object.

3. The method of claim 2, wherein the set of business hours in terms of the business hours of the tenant offices are different than a calendar time associated with the on-demand service.

4. The method of claim 1, further comprising performing mathematical calculations, based on the stored set of business hours.

5. The method of claim 4, wherein the mathematical calculations are capable of being performed at the user level.

6. The method of claim 1, wherein the one or more exceptions include user defined exceptions.

7. The method of claim 1, wherein the one or more exceptions include the set of holiday hours.

8. The method of claim 7, wherein the set of holiday hours are configured to reoccur automatically.

9. The method of claim 1, wherein the one or more exceptions are transparently integrated into the set of business hours.

10. The method of claim 9, wherein the integration of the one or more exceptions into the set of business hours is automatic.

11. The method of claim 1, further comprising generating alerts utilizing the workflow and the set of business hours.

12. The method of claim 1, wherein the on-demand service includes a multi-tenant on-demand database service.

13. A non-transitory machine-readable medium carrying one or more sequences of instructions which, when executed by one or more processors, cause the one or more processors to carry out the steps of:
   receiving a set of business hours corresponding to a plurality of offices in different locations from a user of an on-demand service, wherein the set of business hours include one or more exceptions to standard business hours associated with the plurality of offices;
   receiving a set of holiday hours corresponding to each of the offices in the different locations from the user of the on-demand service;
   automatically integrating the set of holiday hours into the set of business hours based on a geographical location of the plurality of offices;
   storing the set of business hours and the set of holiday hours in a shared database associated with the user;
   providing access to the stored set of business hours and the set of holiday hours for the user to track, at a user level; and
   generating a workflow for one of the offices based on the corresponding set of holiday hours and the corresponding set of business hours;
   wherein the set of business hours are stored in a business hours object and the set of holiday hours are stored in a holiday hours object, and further the set of holiday hours correspond to the set of business hours by linking the holiday hours object with the business hours object;
   wherein the set of holiday hours are utilized to suspend the set of business hours and rules associated with the set of business hours;
   wherein the business hours object is included in a formula that calculates times using the set of business hours that are stored in a business hours object, and the formula is used in a workflow rule.

14. An apparatus, comprising:
   a processor; and
      one or more sequences of instructions stored on a non-transitory medium which, when executed by the processor, cause the processor to carry out the steps of:
         receiving a set of business hours corresponding to a plurality of offices in different locations from a user of an on-demand service, wherein the set of business hours include one or more exceptions to standard business hours associated with the plurality of offices;
         receiving a set of holiday hours corresponding to each of the offices in the different locations from the user of the on-demand service;
         automatically integrating the set of holiday hours into the set of business hours based on a geographical location of the plurality of offices;
         storing the set of business hours and the set of holiday hours in a shared database associated with the user;
         providing access to the stored set of business hours and the set of holiday hours for the user to track, at a user level; and
         generating a workflow for one of the offices based on the corresponding set of holiday hours and the corresponding set of business hours;
         wherein the set of business hours are stored in a business hours object and the set of holiday hours are stored in a holiday hours object, and further the set of holiday hours correspond to the set of business hours by linking the holiday hours object with the business hours object;
         wherein the set of holiday hours are utilized to suspend the set of business hours and rules associated with the set of business hours;
         wherein the business hours object is included in a formula that calculates times using the set of business hours that are stored in a business hours object, and the formula is used in a workflow rule.

15. A method for transmitting code for use in a multi-tenant database system on a transmission medium, the method comprising:
   transmitting code for receiving a set of business hours corresponding to a plurality of offices in different locations from a user of an on-demand service, wherein the set of business hours include one or more exceptions to standard business hours associated with the plurality of offices, utilizing a processor;
   transmitting code for receiving a set of holiday hours corresponding to each of the offices in the different locations from the user of the on-demand service;
   transmitting code for automatically integrating the set of holiday hours into the set of business hours based on a geographical location of the plurality of offices;
   transmitting code for storing the set of business hours and the set of holiday hours in a shared database associated with the user, utilizing a processing machine;
   transmitting code for providing access to the stored set of business hours and the set of holiday hours for the user to track, at a user level; and
   transmitting code for generating a workflow for one of the offices based on the corresponding set of holiday hours and the corresponding set of business hours;
   wherein the set of business hours are stored in a business hours object and the set of holiday hours are stored in a holiday hours object, and further the set of holiday hours correspond to the set of business hours by linking the holiday hours object with the business hours object;
   wherein the set of holiday hours are utilized to suspend the set of business hours and rules associated with the set of business hours;
   wherein the business hours object is included in a formula that calculates times using the set of business hours that are stored in a business hours object, and the formula is used in a workflow rule.

16. The method of claim 1, wherein each of a plurality of business hours objects corresponding to a different one of the offices is linked to a same holiday hours object, such that that each of the business hours objects shares a same set of holiday hours stored in the holiday hours object.

17. The method of claim 1, wherein an association table links the holiday hours object to the business hours object.

* * * * *

UNITED STATES PATENT AND TRADEMARK OFFICE
CERTIFICATE OF CORRECTION

| | | |
|---|---|---|
| PATENT NO. | : 8,521,571 B1 | Page 1 of 1 |
| APPLICATION NO. | : 12/437461 | |
| DATED | : August 27, 2013 | |
| INVENTOR(S) | : Fischer et al. | |

It is certified that error appears in the above-identified patent and that said Letters Patent is hereby corrected as shown below:

In the claims:

Col. 16 line 14, please replace "offices:" with --offices;--.

Signed and Sealed this
Twenty-first Day of April, 2015

Michelle K. Lee
*Director of the United States Patent and Trademark Office*